(12) United States Patent
Harayama

(10) Patent No.: US 12,717,748 B2
(45) Date of Patent: Aug. 25, 2026

(54) DATA COMMUNICATION SYSTEM AND SLAVE DEVICE

(71) Applicant: LAPIS Technology Co., Ltd., Yokohama (JP)

(72) Inventor: Kunihiro Harayama, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/660,191

(22) Filed: May 9, 2024

(65) Prior Publication Data

US 2024/0378169 A1 Nov. 14, 2024

(30) Foreign Application Priority Data

May 11, 2023 (JP) ................................ 2023-078495

(51) Int. Cl.
*G06F 13/00* (2006.01)
*G06F 13/42* (2006.01)

(52) U.S. Cl.
CPC ...... *G06F 13/4247* (2013.01); *G06F 13/4282* (2013.01); *G06F 2213/40* (2013.01)

(58) Field of Classification Search
None
See application file for complete search history.

(56) References Cited

U.S. PATENT DOCUMENTS 6,839,393 B1 * 1/2005 Sidiropoulos ....... G06F 13/4217 375/371
2016/0314087 A1 * 10/2016 Poulsen ................ G06F 13/362
2018/0225230 A1 * 8/2018 Litichever ............... G06F 21/56
2023/0195672 A1 * 6/2023 Wen .......................... G06F 1/10 710/314

FOREIGN PATENT DOCUMENTS

JP 2009129685 6/2009

* cited by examiner

*Primary Examiner* — Henry Tsai
*Assistant Examiner* — Dean Phan
(74) *Attorney, Agent, or Firm* — JCIPRNET

(57) ABSTRACT

A master device transmits a clock signal to a first slave device together with a write data signal including write data pieces respectively corresponding to slave devices connected in cascade. Each slave device includes a buffer that receives the clock signal, outputs an amplified clock signal, and transmits the clock signal to a next stage slave device, and an information acquisition circuit that acquires information data pieces and reads them as read data pieces. The slave devices take in a series of write data pieces included in the write data signal while shifting them at the timing of the clock signal output from each of the master device and the buffer and transmit a read data signal including a series of read data pieces read from each information acquisition circuit to the master device via the first slave device while shifting them at the timing of the clock signal group.

18 Claims, 12 Drawing Sheets

DATA COMMUNICATION SYSTEM AND SLAVE DEVICE

CROSS-REFERENCE TO RELATED APPLICATIONS

This application claims the priority benefit of Japan Application No. 2023-078495, filed on May 11, 2023. The entirety of the above-mentioned patent application is hereby incorporated by reference herein and made a part of this specification.

BACKGROUND

Technical Field

The disclosure relates to a data communication system that executes data communication between a master device and a plurality of slave devices and a slave device.

Description of Related Art

In recent years, display devices have been commercialized that use light emitting elements such as light emitting diodes (LEDs) and laser diodes (LDs) as backlights for pixels and liquid crystal display panels.

Furthermore, a lighting device has been proposed in which a plurality of lighting units (slave devices) consisting of the above-described LEDs, LDs, and the like can be individually controlled by one controller (master device) (for example, see Japanese Patent Laid-Open No. 2009-129685). In such a lighting device, the controller and the plurality of lighting units are connected in a daisy chain via a communication cable. The controller transmits a series of lighting data pieces (packets) that specify lighting color and brightness for each lighting unit to one lighting unit. Each lighting unit is equipped with a communication circuit, and when the lighting unit receives a series of lighting data pieces, the lighting unit extracts lighting data corresponding to itself from the series of lighting data pieces, and controls the light emitting elements based on the lighting data.

Further, as such a communication system, there is known one that employs serial peripheral interface (SPI) which is one of serial bus standards and executes data communication between a master device and a plurality of slave devices using four lines of signal lines below.

CLK: Serial Clock

MISO: Master In Slave Out

MOSI: Master Out Slave In

CS: Chip Select

Further, in the SPI, a daisy chain system is shown in which the master device and the plurality of slave devices are connected in a daisy chain via four terminals that serve as inputs or outputs for each of the four lines of signal lines provided respectively.

In FIG. 1, the plurality of slave devices (SLV) is cascade-connected to the master device (MCU).

The master device includes an output terminal CS, an output terminal CLK, an output terminal MOSI, and an input terminal MISO. Each of the slave devices includes an input terminal CS, an input terminal CLK, an input terminal MOSI, and an output terminal MISO.

Here, the output terminal CS of the master device and each input terminal CS of the slave device are connected via a single wire and the output terminal CLK of the master device and each input terminal CLK of the slave device are connected via a single wire.

Further, the input terminal MOSI of the slave device connected to the first stage of the cascade-connected slave devices is connected to the output terminal MOSI of the master device. Further, the output terminal MISO of the slave device connected to the last stage of the cascade-connected slave devices is connected to the input terminal MISO of the master device.

Furthermore, in the pair of slave devices connected to each other, the output terminal MISO of the front stage slave device and the input terminal MOSI of the rear stage slave device are connected.

Here, the master device supplies the chip select signal from its own output terminal CS to each input terminal CS of the slave device and supplies the serial clock signal from its own output terminal CLK to each input terminal CLK of the slave device.

The master device transmits a series of data pieces corresponding to respective slave devices from its own output terminal MOSI to the input terminal MOSI of the first slave device. At this time, when each of the first to last stage slave devices receives a series of data pieces at the input terminal MOSI, the slave device takes in the data piece corresponding to itself from there and is set to the operating state according to the data piece. Further, at this time, each slave device transmits a series of received data pieces from its own output terminal MISO to the input terminal MOSI of the next stage slave device. Accordingly, a data piece for setting its own state is supplied to each slave device in the order of the first to last slave devices.

For example, each slave device transmits one in which sensor data or the like acquired by itself is converted into a serial signal to the input terminal MOSI of the next stage slave device via its own output terminal MISO. Accordingly, the serial signal including a series of sensor data pieces acquired by respective slave devices is supplied to the input terminal MOSI of the last stage slave device. At this time, the last stage slave device supplies one in which the sensor data piece acquired by itself is added to the serial signal received at the input terminal MOSI from its own output terminal MISO to the master device. Accordingly, the master device can collect sensor data obtained by each of the first to last slave devices.

According to the SPI daisy chain mode described above, it is possible to control the plurality of slave devices and acquire data from each slave device via four wires regardless of the number of slave devices.

However, in the configuration according to the SPI daisy chain mode described above, as the number of slave devices increases, the load capacitance connected to a single wire that transmits the serial clock signal (CLK) increases by that amount, so that the waveform of the serial clock signal becomes dull. Therefore, a problem arises in that there is a limit to the number of slave devices connected to the master device in order to achieve high-speed communication.

SUMMARY

A data communication system according to the disclosure includes: a master device; a first slave device connected to the master device; and a second to N-th (N is an integer of 2 or more) slave devices cascade-connected to the first slave device, wherein the master device and the adjacent devices of the first to N-th slave devices are connected by at least three wires including a wire for transmitting a clock signal, a wire for transmitting a write data signal, and a wire for transmitting a read data signal.

A slave device according to the disclosure includes: a first input terminal for receiving a write data signal; a second input terminal for receiving a read data signal; a third input terminal for receiving a clock signal; a first to third output terminals; a write data transmission/reception circuit that takes in a write data piece corresponding to itself from the write data signal received at the first input terminal and outputs a new write data signal obtained by excluding the write data piece corresponding to itself from the write data signal from the first output terminal; and a read data transmission/reception circuit that outputs a new read data signal obtained by adding a read data piece read from itself to the read data signal received at the second input terminal from the second output terminal, wherein the clock signal received at the third input terminal is internally transmitted and output from the third output terminal.

DESCRIPTION OF THE EMBODIMENTS

The disclosure provides a data communication system and a slave device capable of executing high-speed communication regardless of the number of slave devices connected to a master device.

In the data communication system according to the disclosure, the master device transmits the clock signal to the first slave device together with the write data signal including the first to N-th write data pieces respectively corresponding to the first to N-th (N is an integer of 2 or more) slave devices connected in cascade. Each of the first to N-th slave devices receives the transmitted clock signal, internally transmits the clock signal, and transmits the clock signal to the next stage slave device. Each of the first to N-th slave devices takes in a series of first to N-th write data pieces included in the write data signal while shifting them at the timing of the clock signal received to itself and transmits the read data signal including a series of read data pieces read from itself to the master device via the first slave device while shifting the read data signal at the timing of the clock signal received to itself.

According to such a data communication system, since the load connected to the wire for transmitting the clock signal is only a single slave device, it is possible to suppress the waveform dullness of the clock signal to less than a predetermined value regardless of the number of stages of slave devices connected in cascade.

Furthermore, according to the data communication system, the clock signal received by the N-th slave device at the last stage is delayed with respect to the clock signal output from the master device, that is, the clock signal received by the first slave device.

However, in the data communication system, the communication between the master device and the first to N-th slave devices is established by the communication between the master device and the first slave device according to the clock signal output from the master device and the communication according to the clock signal output from one slave device between adjacent slave devices.

Therefore, even if there is a delay corresponding to the number of stages of cascades of slave devices in the clock signal received by the N-th slave device at the last stage with respect to the clock signal output from the master device, communication can be executed in synchronization with the clock signal.

Therefore, according to the disclosure, high-speed communication can be executed regardless of the number of stages of slave devices connected to the master device.

First Embodiment

Figure 1:
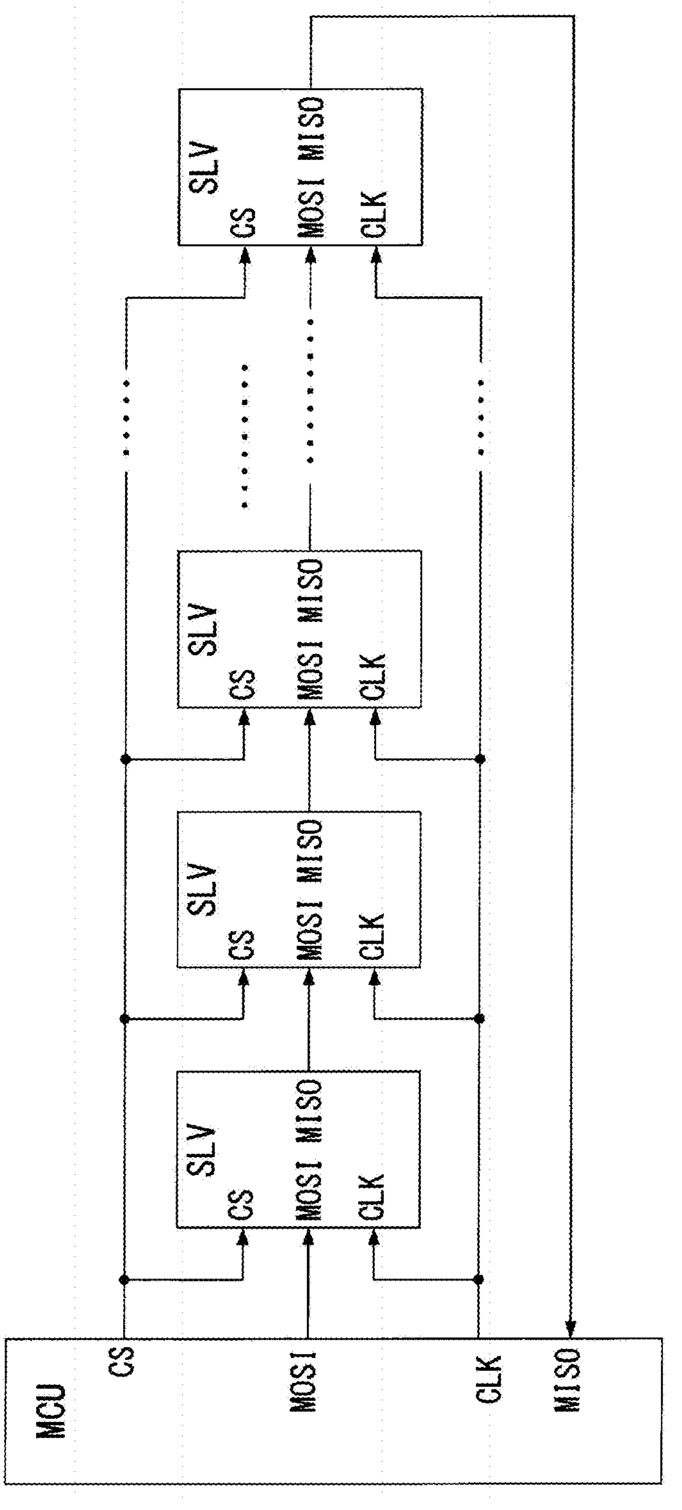
FIG. 1 is a block diagram showing a connection form using a conventional SPI daisy chain method.
Figure 2:
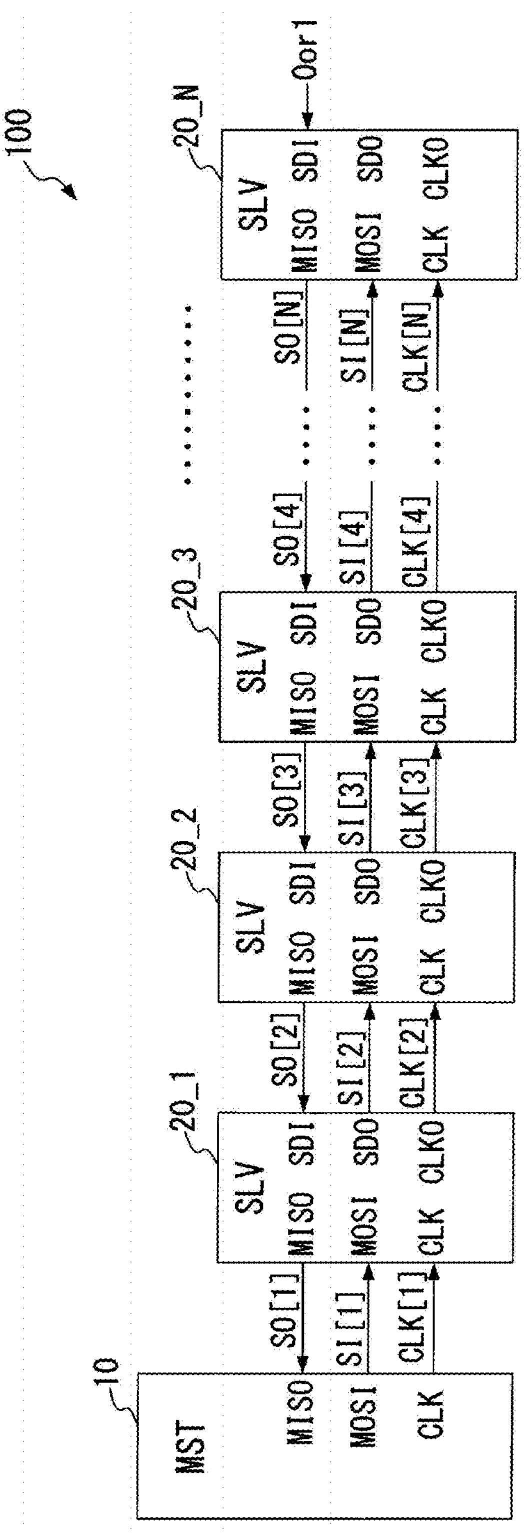
FIG. 2 is a block diagram showing a configuration of a data communication system 100 which is an example of a data communication system according to the disclosure.

FIG. 2 is a block diagram showing a configuration of a data communication system 100 which is an example of a data communication system according to the disclosure.

The data communication system 100 includes a master device (MST) 10 and slave devices (SLV) 20_1 to 20_N (N is an integer of 2 or more) that communicate in the form of serial signals based on the serial peripheral interface (SPI) standard.

The master device 10 includes an input terminal MISO that serves as MISO (master in slave out), an output terminal MOSI that serves as MOSI (master out slave in), and an output terminal CLK that transmits out a serial clock signal.

The master device 10 transmits a write data signal SI[1], which is individually written to each of the slave devices 20_1 to 20_N and each indicates a series of write data pieces of, for example, 8 bits in the form of a serial signal, from the output terminal MOSI to the slave device 20_1. Further, the master device 10 receives a read data signal SO[1], which is individually read from each of the slave devices 20_1 to 20_N and each indicates a series of read data pieces of, for example, 8 bits in the form of a serial signal, at the input terminal MISO. Furthermore, the master device 10 transmits a clock signal CLK [1] as a serial clock signal to the slave device 20_1 from the output terminal CLK.

Each of the slave devices 20_1 to 20_N includes a functional circuit that is set and operated in a state based on the write data piece corresponding to itself included in the above-described write data signal and has a function of acquiring a data piece that becomes the above-described read data piece.

The slave devices 20_1 to 20_N are connected in series, that is, cascade-connected to the master device 10 in the order of first to N-th as shown in FIG. 2.

Each of the slave devices 20_1 to 20_N includes an input terminal CLK that receives a clock signal CLK and an output terminal CLKO that supplies the clock signal CLK received at this input terminal CLK to the input terminal CLK of the next stage slave device via a buffer. Furthermore, the output terminal CLKO of the N-th stage (last stage) slave device 20_N is in an open state.

Further, each of the slave devices 20_1 to 20_N includes an input terminal SDI for receiving a read data signal SO transmitted from the front stage device and an output terminal MISO for outputting the read data signal SO containing its own read data piece. Furthermore, the input terminal SDI of the N-th stage slave device 20_N is in a fixed state of logic level 0 or 1.

Here, each of the slave devices excluding the first stage (initial stage) slave device 20_1 among the slave devices 20_1 to 20_N supplies the read data signal SO output from its own output terminal MISO to the input terminal SDI of the front stage slave device. Furthermore, the first stage slave device 20_1 supplies the read data signal SO[1] output from its own output terminal MISO to the input terminal MISO of the master device 10.

Furthermore, each of the slave devices 20_1 to 20_N includes an input terminal MOSI for receiving the write data signal SI and an output terminal SDO for outputting the write data signal SI obtained by excluding its own write data piece to the input terminal MOSI of the next stage slave device. Furthermore, the output terminal SDO of the N-th stage slave device 20_N is in an open state. Here, the first stage slave device 20_1 receives the write data signal SI[1] transmitted from the master device 10 at its own input terminal MOSI.

Thus, as shown in FIG. 2, a k-th slave device 20_*k* (k is an integer of 2 or more) among the slave devices 20_1 to 20_N connected in cascade receives a write data signal SI[k] output from a front stage slave device 20_(k−1) at the input terminal MOSI and takes in the write data signal at the timing of a clock signal CLK [k] received at the above-described input terminal CLK. Then, the slave device 20_*k* outputs a write data signal SI[k+1] obtained by excluding its own write data piece from the write data signal SI[k] from the output terminal SDO to the next stage slave device 20_(k+1) at the timing of the clock signal CLK [k]. Further, the slave device 20_*k* outputs the above-described clock signal CLK [k] from the output terminal CLKO to the next stage slave device 20_(k+1) as a clock signal CLK [k+1] via a buffer.

Furthermore, the k-th slave device 20_*k* receives a read data signal SO[k+1] output from the next stage slave device 20_(k+1) at the input terminal SDI and takes in the read data signal at the timing of the clock signal CLK [k]. Then, the k-th slave device 20_*k* outputs a read data signal SO[k] obtained by adding the read data piece read from itself to a read data signal SO[k+1] from the output terminal MISO to the front stage slave device 20_(k−1).

Figure 3:
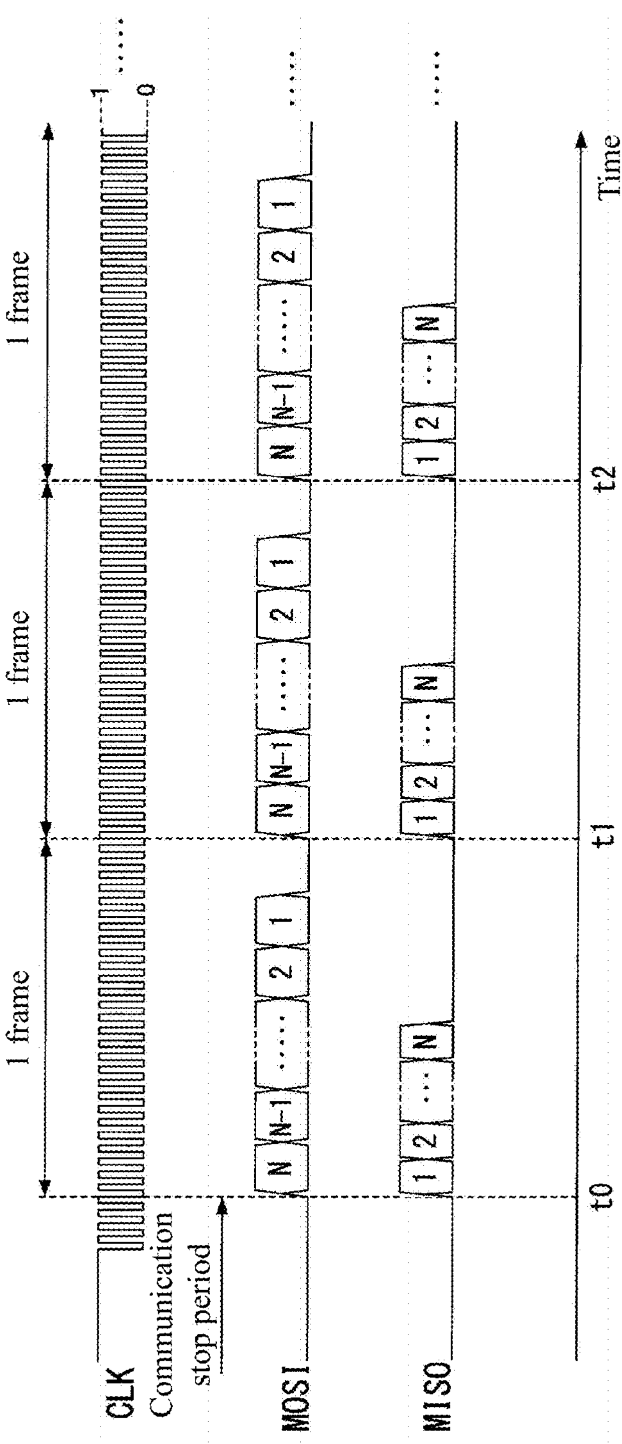
FIG. 3 is a time chart showing an example of communication format and timing specifications in the data communication system 100.

FIG. 3 is a time chart showing an example of communication format and timing specifications in the data communication system 100.

In the example shown in FIG. 3, communication between the master device 10 and the slave devices 20_1 to 20_N is executed every frame at a predetermined period.

That is, the master device 10 outputs the write data signal SI[1], which is individually written to each of the slave devices 20_1 to 20_N and each contains a series of write data pieces obtained by arranging first to N-th write data pieces each consisting of, for example, 8 bits in the order of N-th, (N−1)-th, (N−2)-th, . . . , third, second, and first, from the output terminal MOSI to the slave device 20_1 every frame.

Accordingly, for example, the N-th write data piece is shifted from the slave device 20_1 toward the slave device 20_N, reaches the N-th stage slave device 20_N, and is taken into each slave device 20. That is, each of the k-th (k is 1, 2, 3, . . . , N) write data pieces is shifted from the slave device 20_1 toward the slave device 20_N and reaches each k-th stage slave device 20_*k* and the slave device 20_*k* takes in the k-th write data piece corresponding to itself.

Furthermore, in the example shown in FIG. 3, the slave device 20_1 outputs the read data signal SO[1], which is read from each of the slave devices 20_1 to 20_N and each contains a series of read data pieces obtained by arranging first to N-th read data pieces consisting of, for example, 4 bits in the order of first, second, third, . . . , (N−2)-th, (N−1)-th, and N-th, to the master device 10 at the supply start time point (t0, t1, t2 shown in FIG. 3) every frame at a predetermined period. The master device 10 receives the read data signal SO[1] at the input terminal MISO.

In this way, according to the data communication system 100, the master device 10 can simultaneously transmit the write data signal to the slave devices 20_1 to 20_N and receive the read data signal read from the slave devices 20_1 to 20_N.

Furthermore, as shown in FIG. 3, the master device 10 may stop supplying the clock signal CLK to the slave device 20_1 during a period when the master device is not communicating with the slave devices 20_1 to 20_N. However, when starting communication with the slave devices 20_1 to 20_N, the master device 10 starts supplying the clock signal CLK from a time point before the time point to at which communication starts as shown in FIG. 3.

Further, the number of bits of each write data piece and read data piece can be set individually as appropriate according to specifications.

Further, in the example shown in FIG. 3, for each frame of a predetermined period, a series of N-th to first write data pieces output by the master device 10 and a series of first to N-th read data pieces output by the slave devices 20_1 to 20_N in that frame are started at the same timing. However, the output start timings of both do not necessarily have to be the same, and the outputs may be started at independent timings.

Figure 4:
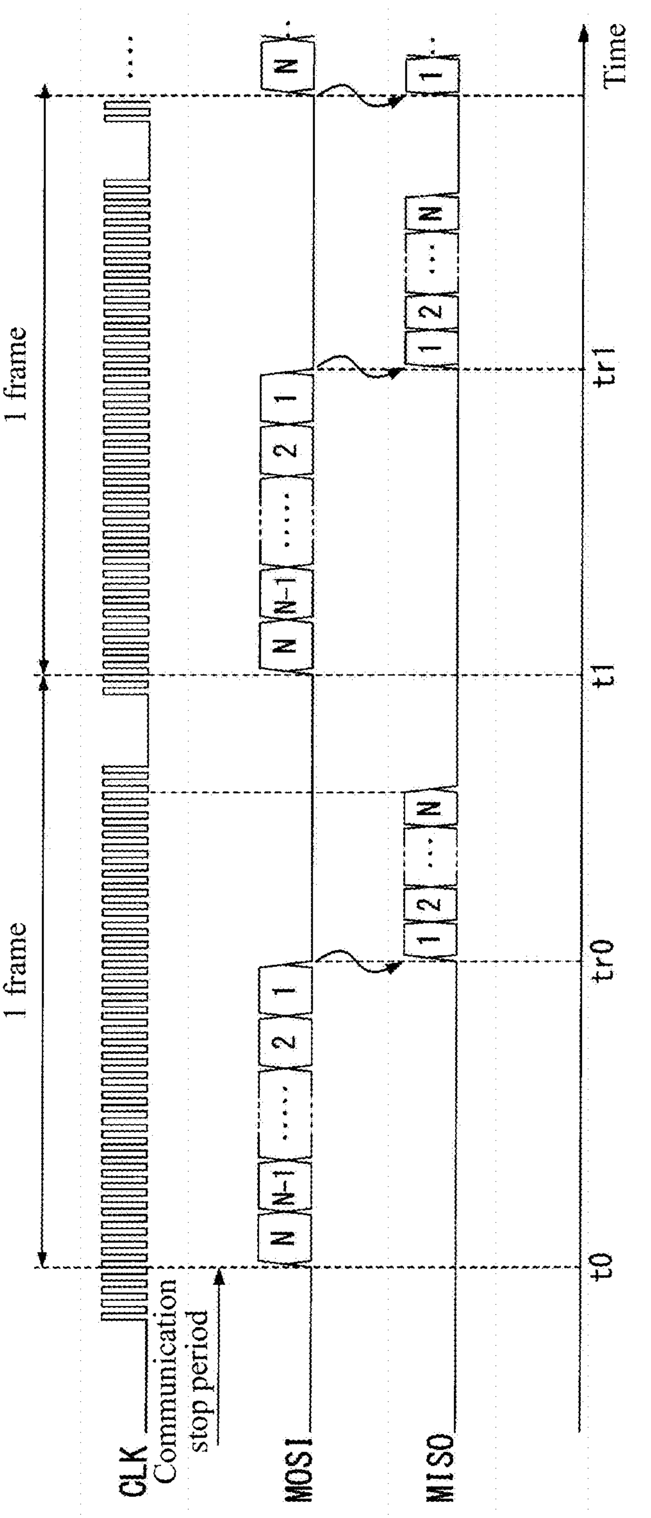
FIG. 4 is a time chart showing another example of communication format and timing specifications in the data communication system 100.

FIG. 4 is a time chart showing another example of communication format and timing specifications in the data communication system 100 made in view of this point.

In the example shown in FIG. 4, similarly to FIG. 3, communication between the master device 10 and the slave devices 20_1 to 20_N is executed every frame at a predetermined period.

At this time, for each frame, the master device 10 outputs the write data signal SI[1] consisting of a series of N-th to first write data pieces similar to those shown in FIG. 3 from the output terminal MOSI to the slave device 20_1. Further, for each frame, the slave device 20_1 outputs the read data signal SO[1] consisting of a series of first to N-th read data pieces similar to those shown in FIG. 3 to the master device 10. The master device 10 receives the read data signal SO[1] at the input terminal MISO.

However, in the example shown in FIG. 4, in each frame, the slave device 20_1 starts the output of a series of first to N-th read data pieces at the time point (tr0, tr1) when writing of the N-th to first write data pieces to each of the slave devices 20_1 to 20_N is completed.

That is, in the specification shown in FIG. 4, in each frame, the master device 10 controls the slave devices 20_1 to 20_N to read the first to N-th read data pieces after the writing of the N-th to first write data pieces is completed. Furthermore, in each frame, the master device 10 may shift to the write operation of the N-th to first write data piece after completing the reading of the first to N-th read data pieces in the slave devices 20_1 to 20_N. In short, the master device 10 may control the slave devices 20_1 to 20_N to complete one of the read and write operations described above in each frame and then execute the other.

Figure 5:
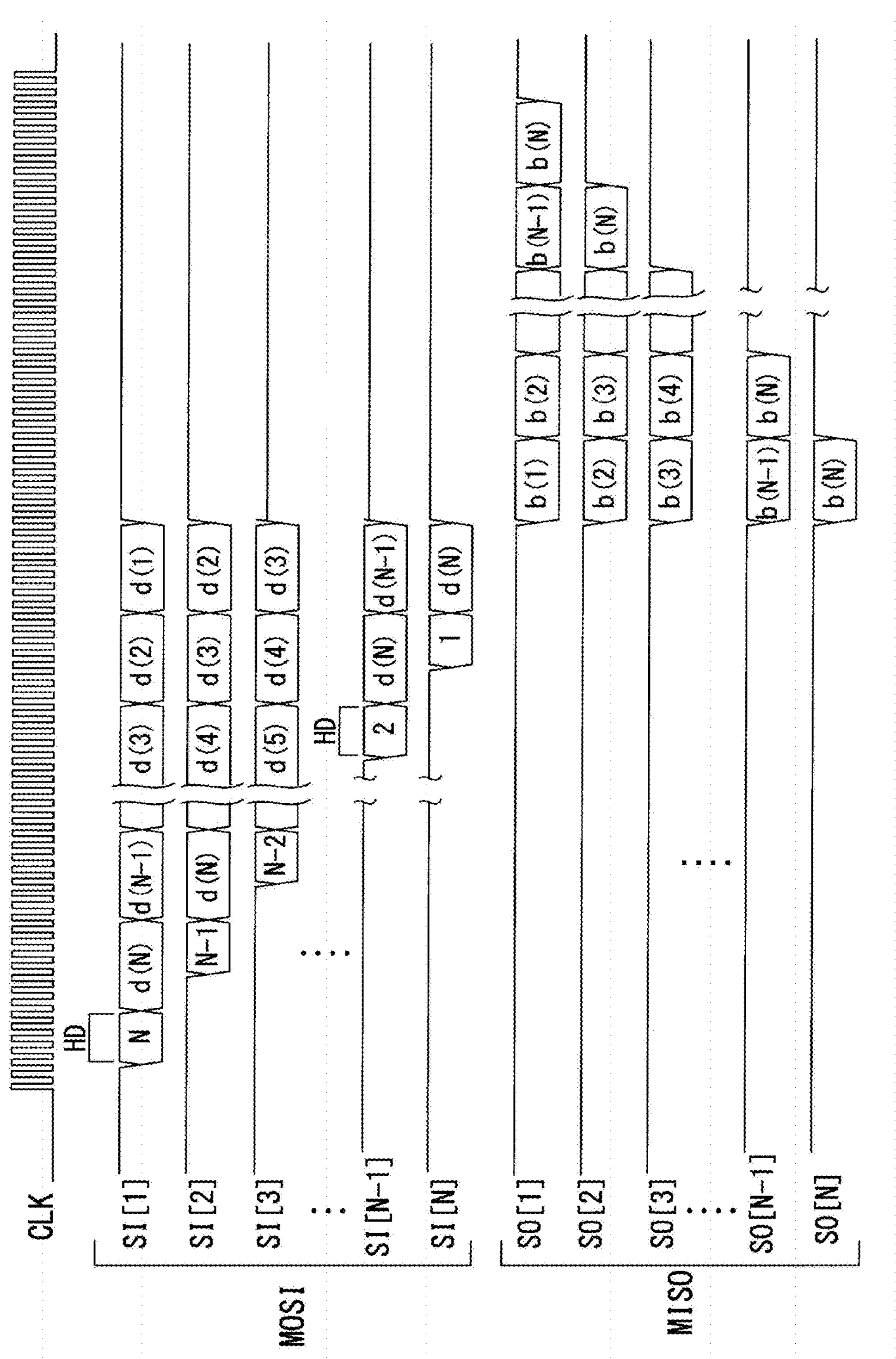
FIG. 5 is a time chart showing a signal format transmitted between a master device 10 and each of slave devices 20_1 to 20_N in accordance with the specifications of FIG. 4.

FIG. 5 is a time chart showing a signal format within a frame of a predetermined period which is transmitted between the master device 10 and each of the slave devices 20_1 to 20_N in accordance with the specifications shown in FIG. 4.

Furthermore, each of the slave devices 20_1 to 20_N sets the timing at which the clock signal CLK changes from the state where the logic level 1 is maintained to logic level 0 as the timing to start writing the write data piece.

First, the master device 10 outputs, as the write data signal SI[1], one in which an identification code HD is added to the beginning of the series of write data d(N), d(N−1), . . . , d(3), d(2), and d(1) individually written to each of the slave devices 20_N to 20_1 to the first stage slave device 20_1. Furthermore, the master device 10 adds the identification code HD indicating "N", which is the cascade number of slave devices connected to the master device 10, to the beginning of the write data signal SI[1] as shown in FIG. 5.

Each of the slave devices 20_1 to 20_N takes in the cascade number indicated by the identification code HD at the beginning of the write data signal SI received from the front stage device. Here, each of the slave devices 20_1 to 20_N sets a time point in which the number of clock pulses from the time when the master device 10 starts supplying the clock signal CLK becomes equal to the number of cascades indicated by the identification code HD multiplied by the number of bits of the write data piece (for example, 8 bits) as a data writing completion timing. Each of the slave devices 20_1 to 20_N takes in only the write data piece corresponding to itself from the series of write data pieces included in the write data signal SI by taking in the write data signal SI received from the front stage device at the data writing completion timing.

Then, each of the slave devices 20_1 to 20_N obtains a series of write data pieces obtained by excluding the write data piece corresponding to itself from the write data signal SI received from the front stage device and outputs the write data signal SI in which a new identification code HD is added to the beginning thereof to the next stage slave device 20. That is, each of the slave devices 20_1 to 20_N adds the identification code HD indicating a new cascade number obtained by subtracting 1 from the cascade number indicated by the identification code HD included in the write data signal SI received from the front stage device to the beginning of the series of write data pieces obtained by excluding the write data pieces corresponding to itself.

Here, when writing of all write data d(N), d(N−1), . . . , d(3), d(2), and d(1) to the slave devices 20_1 to 20_N is completed, each of the slave devices 20_1 to 20_N reads out the data piece acquired by itself as a read data piece. For example, the slave device 20_1 reads the data piece acquired by itself as read data b(1), the slave device 20_2 reads the data piece acquired by itself as read data b (2), and the slave device 20_N reads the data piece acquired by itself as read data b (N).

Then, the slave device 20_*k* (k is 1, 2, 3, . . . , N) starts a read operation of outputting the read data signal SO[k] in which its read data b (k) is added to the beginning of the series of read data pieces included in the read data signal SO[k+1] received from the next stage slave device 20_(k+1) to the front stage device at the timing of the clock signal CLK [k].

Accordingly, the first stage slave device 20_1 outputs the read data signal SO[1] including a series of read data b(1) to b (N) which are data pieces individually acquired by the slave devices 20_1 to 20_N to the master device 10.

The master device 10 acquires data pieces respectively individually acquired by the slave devices 20_1 to 20_N by taking in the read data signal SO[1] at the timing of the clock signal CLK [1].

At this time, each of the slave devices 20_1 to 20_N stops outputting the read data signal SO at a time point in which the number of clock pulses of the clock signal CLK from the data writing completion timing becomes equal to the number of cascades obtained during writing multiplied by the number of bits of the read data piece. Accordingly, the output operation automatically stops at a time point in which the first stage (initial stage) slave device 20_1 finishes outputting all of the read data b2 to b (N) of the second to N-th stage (last stage) slave devices 20_2 to 20_N to the master device 10.

In this way, in the operation shown in FIG. 5, the identification code HD indicating the number of cascades is added to the beginning of the write data signal SI, and the own data write timing is obtained from this number of cascades.

Accordingly, since each of the slave devices 20_2 to 20_N can be operated individually without using a chip select signal CS specified in the SPI standard, the area of the entire data communication system can be reduced by the amount that the chip select signal CS is no longer necessary.

Furthermore, in FIG. 5, the signal format is shown by exemplifying the case where the read data signal SO is read out after the write data signal SI is written to the slave devices 20_1 to 20_N, but the same can also apply to the case where the writing of the write data signal SI is started after the reading of the read data signal SO is completed. At this time, the identification code HD indicating the number of cascades is added to the beginning of the read data series included in the read data signal SO. In short, when write and read operations are executed consecutively in each frame, it is sufficient to add the identification code HD indicating the number of cascades of slave devices 20_1 to 20_N to the beginning of the data series to be executed first.

Further, each of the slave devices 20_1 to 20_N has the same circuit configuration.

Figure 6:
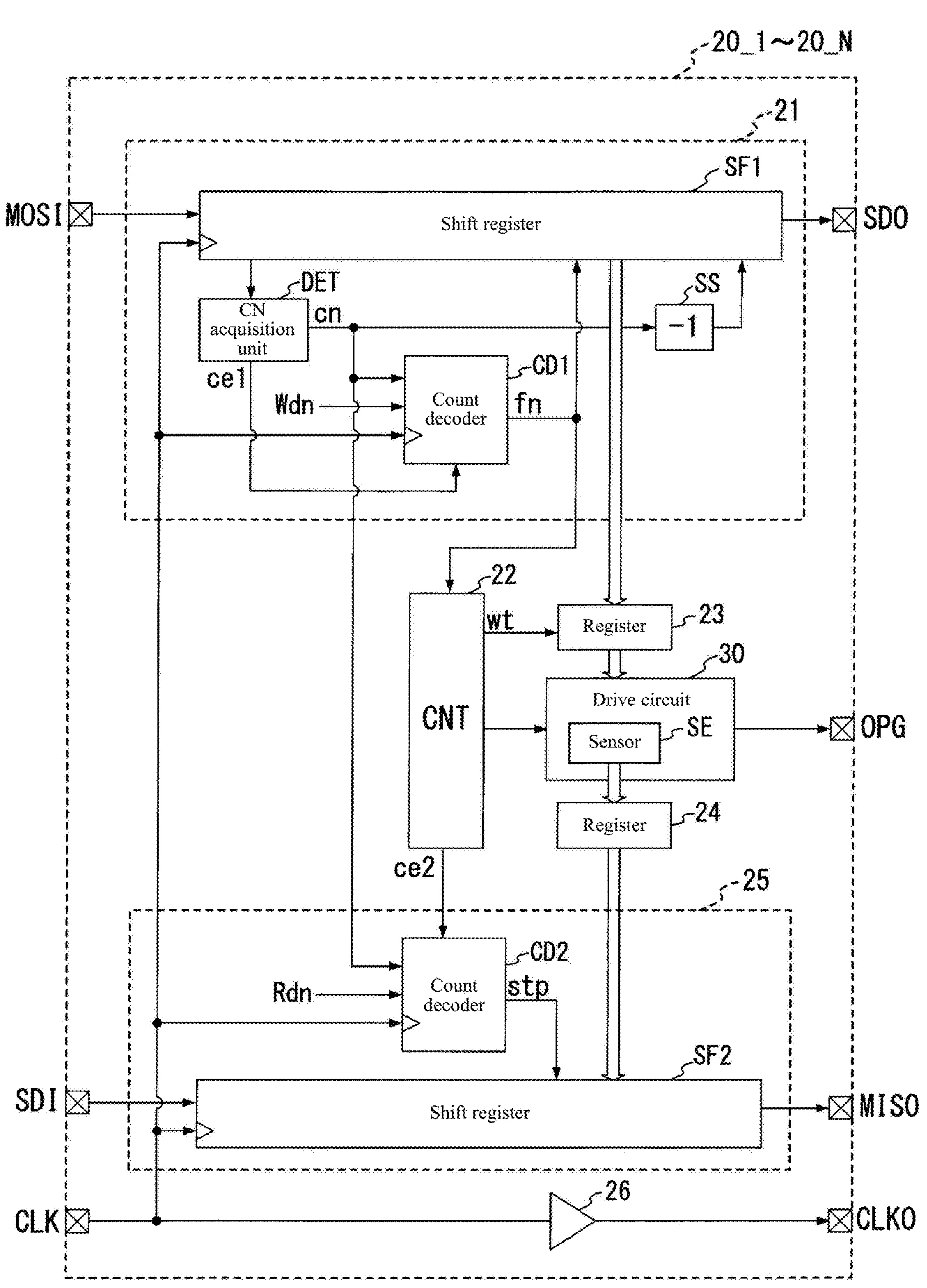
FIG. 6 is a block diagram showing an example of a configuration of each of the slave devices 20_1 to 20_N.

FIG. 6 is a block diagram showing an example of the configuration of each of the slave devices 20_1 to 20_N.

Each of the slave devices 20_1 to 20_N includes a drive circuit 30 that functions as a current output circuit included in a driver that drives a load such as an light emitting diode (LED) backlight of a liquid crystal display or a lighting LED.

The drive circuit 30 generates a drive signal having a drive current for driving the load externally attached to an output terminal OPG based on the write data piece output from the master device 10 and specifying the current value of the drive current and its output timing and outputs the drive signal from the output terminal OPG. Further, the drive circuit 30 includes a sensor SE as an information acquisition circuit that detects the temperature, output voltage, current, and the like within the driver and obtains sensor data (information data) indicating the detected value as an 8-bit digital value, for example. At this time, the drive circuit 30 reads sensor data detected by the sensor SE.

Further, each of the slave devices 20_1 to 20_N includes an input terminal MOSI for inputting the write data signal SI, an output terminal SDO for outputting the write data signal SI, an input terminal SDI for inputting the read data signal SO, an output terminal MISO for outputting the read data signal SO, an input terminal CLK for inputting the clock signal CLK, and an output terminal CLKO for outputting the clock signal CLK.

Furthermore, each of the slave devices 20_1 to 20_N includes a write data transmission/reception circuit 21, a control circuit (CNT) 22, registers 23 and 24, a read data transmission/reception circuit 25, and a buffer 26.

The write data transmission/reception circuit 21 includes a cascade number (CN) acquisition unit DET, a count decoder CD1, and a subtraction circuit SS. Further, the write data transmission/reception circuit 21 includes a shift register SF1 that takes in the write data signal SI input to the input terminal MOSI at the timing of the clock signal CLK received at the input terminal CLK.

The cascade number acquisition unit DET detects the identification code HD from the write data signal SI received by the shift register SF1 and supplies the cascade number indicated by the identification code HD as a cascade number cn to the count decoder CD1, the subtraction circuit SS, and the read data transmission/reception circuit 25. Furthermore, when the cascade number acquisition unit DET detects the identification code HD, the cascade number acquisition unit supplies a count enable signal ce1 to the count decoder CD1.

Figure 7:
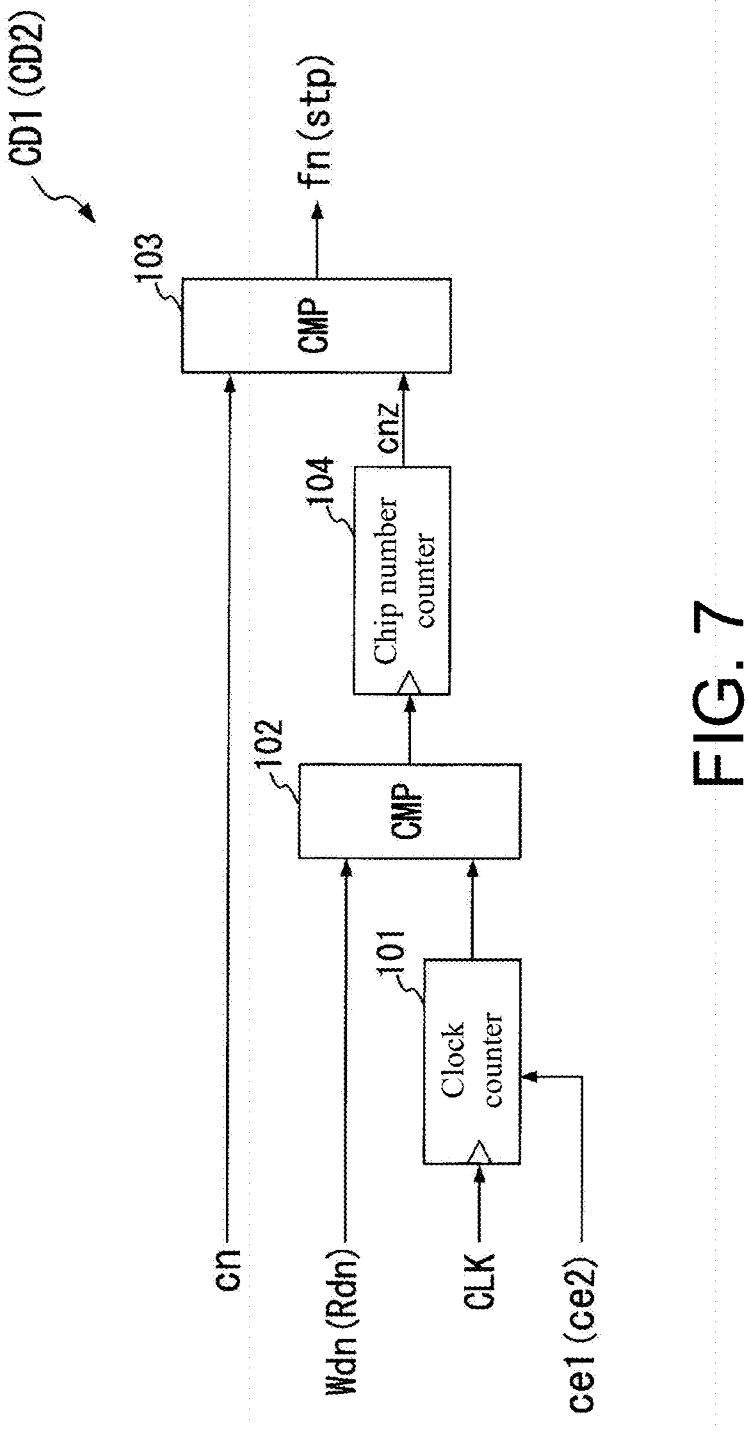
FIG. 7 is a block diagram showing an internal configuration of a count decoder CD1 (CD2).

FIG. 7 is a block diagram showing an internal configuration of the count decoder CD1.

The count decoder CD1 includes a clock counter 101, comparison circuits 102 and 103, and a chip number counter 104.

The clock counter 101 initializes the count value to zero in response to the count enable signal ce1, starts counting the number of clock pulses of the clock signal CLK, and supplies the count value to the comparison circuit 102. The comparison circuit 102 receives a fixed data bit number Wdn indicating the number of bits of the write data piece and determines whether the number of bits of the write data piece indicated by the data bit number Wdn matches the count value supplied from the clock counter 101. At this time, when the comparison circuit 102 determines that both match, the comparison circuit supplies a match signal consisting of a single pulse to the chip number counter 104. The chip number counter 104 counts the number of pulses caused by the match signal and supplies the count value to the comparison circuit 103 as the remaining cascade number cnz. The comparison circuit 103 determines whether such a remaining cascade number cnz matches the cascade number cn indicated by the identification code HD and outputs a completion signal fn when determining that both match.

With such a configuration, the count decoder CD1 counts the number of clock pulses of the clock signal CLK when detecting the identification code HD from the write data signal SI. Then, the count decoder CD1 outputs the completion signal fn when the count value matches the result of multiplying the cascade number cn indicated by the identification code HD by the number of bits of the write data piece indicated by the data bit number Wdn.

Then, the count decoder CD1 supplies the completion signal fn to the shift register SF1 and the control circuit 22.

The subtraction circuit SS generates the identification code HD that indicates a new cascade number obtained by subtracting "1" from the cascade number cn supplied from the cascade number acquisition unit DET, and supplies the identification code to the shift register SF1.

The shift register SF1 takes in a series of write data pieces included in the write data signal SI input to the input terminal MOSI while shifting them one bit at the timing in synchronization with the clock signal CLK. Then, the shift register SF1 outputs one in which the identification code HD supplied from the above-described subtraction circuit SS is added to the beginning of the series of taken write data pieces from the output terminal SDO as a new write data signal SI in serial format. Further, the shift register SF1 converts each taken written data piece in serial format into a parallel signal format and sequentially outputs the result to the register 23. Furthermore, the shift register SF1 initializes the data taken into itself (for example, sets all bits to logic level 1) in response to the completion signal fn. Accordingly, a new write data signal SI including a series of write data pieces obtained by excluding only its own write data piece from the series of write data pieces included in the write data signal SI input to the input terminal MOSI is output from the output terminal SDO.

The control circuit 22 supplies a write instruction signal wt to the register 23 in response to the completion signal fn, and also supplies a count enable signal ce2 to the read data transmission/reception circuit 25. Further, the control circuit 22 supplies various control signals that control the drive circuit 30 to the drive circuit 30.

The register 23 holds only the write data piece output at the timing of the write instruction signal wt in each of the write data pieces output from the shift register SF1 and supplies the write data piece to the drive circuit 30. Accordingly, the drive circuit 30 generates a drive current having a current value according to the write data piece supplied from the register 23 and outputs the drive current to the load externally attached to the output terminal OPG at the output timing specified by the write data piece.

The register 24 holds the sensor data piece detected by the sensor SE and supplies the sensor data piece to the read data transmission/reception circuit 25.

The read data transmission/reception circuit 25 includes a count decoder CD2 and a shift register SF2.

The count decoder CD2 has the same internal configuration as the count decoder CD1, that is, the configuration shown in FIG. 7. At this time, the count decoder CD2 receives the count enable signal ce2 from the control circuit 22 instead of the count enable signal ce1 and receives a data bit number Rdn indicating the number of bits of the read data piece instead of the data bit number Wdn. Furthermore, the count decoder CD2 supplies a completion signal stp to the shift register SF2 instead of the completion signal fn.

Accordingly, the count decoder CD2 counts the number of clock pulses of the clock signal CLK in response to the count enable signal ce2 and supplies the completion signal stp to the shift register SF2 when the count value matches the result of multiplying the cascade number cn indicated by the identification code HD by the number of bits of the read data piece indicated by the data bit number Rdn.

The shift register SF2 takes in a sensor data piece supplied from the register 24 as its own read data piece. Then, the shift register SF2 shifts this own read data piece one bit at the timing in synchronization with the clock signal CLK and outputs the own read data piece in serial format. In the meantime, the shift register takes in a series of read data pieces included in the read data signal SO input to the input terminal SDI in serial format while shifting them one bit at the timing in synchronization with the clock signal CLK. Accordingly, following its own read data piece, the shift register SF2 outputs, as the read data signal SO, a serial signal indicating a series of read data pieces included in the read data signal SO input to the input terminal SDI from the output terminal MISO.

When the shift register SF2 receives the completion signal stp from the count decoder CD2, the shift register resets the taken contents and stops the shift operation.

The buffer 26 outputs a clock signal CLK obtained by amplifying the clock signal CLK received at the input terminal CLK from the output terminal CLKO.

Furthermore, each of the write data transmission/reception circuit 21 and the read data transmission/reception circuit 25 may be configured with a First-In First Out (FIFO) memory or the like.

Second Embodiment

Figure 8:
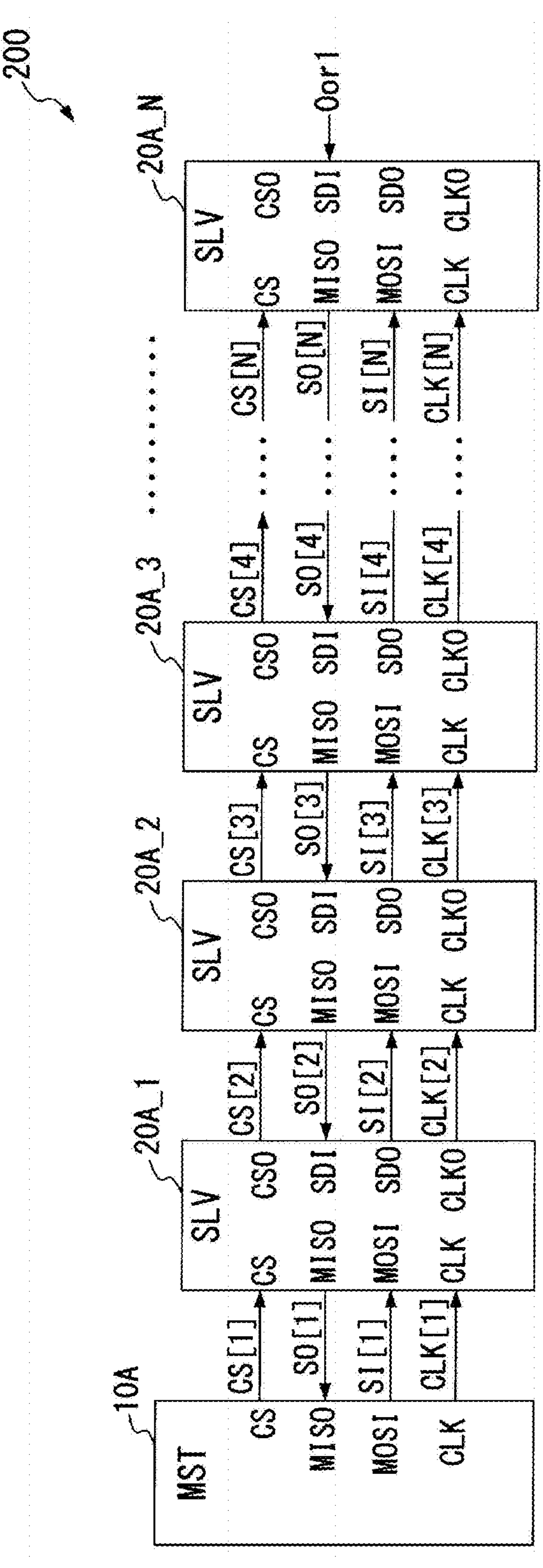
FIG. 8 is a block diagram showing a configuration of a data communication system 200 which is another example of the data communication system according to the disclosure.

FIG. 8 is a block diagram showing a configuration of a data communication system 200 which is another example of the data communication system according to the disclosure.

The data communication system 200 employs a master device 10A and slave devices 20A_1 to 20A_N instead of the master device 10 and slave devices 20_1 to 20_N of the data communication system 100.

Furthermore, the master device 10A and the slave devices 20A_1 to 20A_N are obtained by adding write and read control functions using a chip select signal CS to the master device 10 and the slave devices 20_1 to 20_N.

That is, compared to the master device 10 shown in FIG. 2, the master device 10A further includes an output terminal CS for outputting the chip select signal CS and outputs a chip select signal CS[1] from the output terminal CS to the slave device 20A_1. Each of the slave devices 20A_1 to 20A_N includes an input terminal CS which receives the chip select signal CS output from the front stage device and an output terminal CSO which outputs the chip select signal CS obtained by amplifying the chip select signal with a buffer. That is, a slave device 20A_k (k is 1, 2, 3, . . . , N) receives the chip select signal CS[k] output from a front stage device at its own input terminal CS and outputs a chip select signal CS[k+1] obtained by amplifying the chip select signal to the input terminal CS of the next stage slave device 20A_(k+1). Furthermore, the output terminal CSO of the N-th stage (last stage) slave device 20A_N is in an open state.

When the received chip select signal CS indicates, for example, logic level 0, as described above, each of the slave devices 20A_1 to 20A_N takes in a series of write data d(1) to d(N) while shifting them one bit and executes a write operation of writing only the write data piece corresponding to itself from the series of write data d(1) to d(N). Furthermore, at this time, each of the slave devices 20A_1 to 20A_N outputs a series of write data pieces obtained by excluding the write data piece corresponding to itself from the series of write data d(1) to d(N) to the next stage slave device 20A.

On the other hand, when the received chip select signal CS indicates, for example, logic level 0, each of the slave devices 20A_1 to 20A_N executes a read operation of outputting a series of read data pieces obtained by adding the read data piece read from itself to the series of read data pieces received from the next stage slave device 20A to the front stage device.

Figure 9:
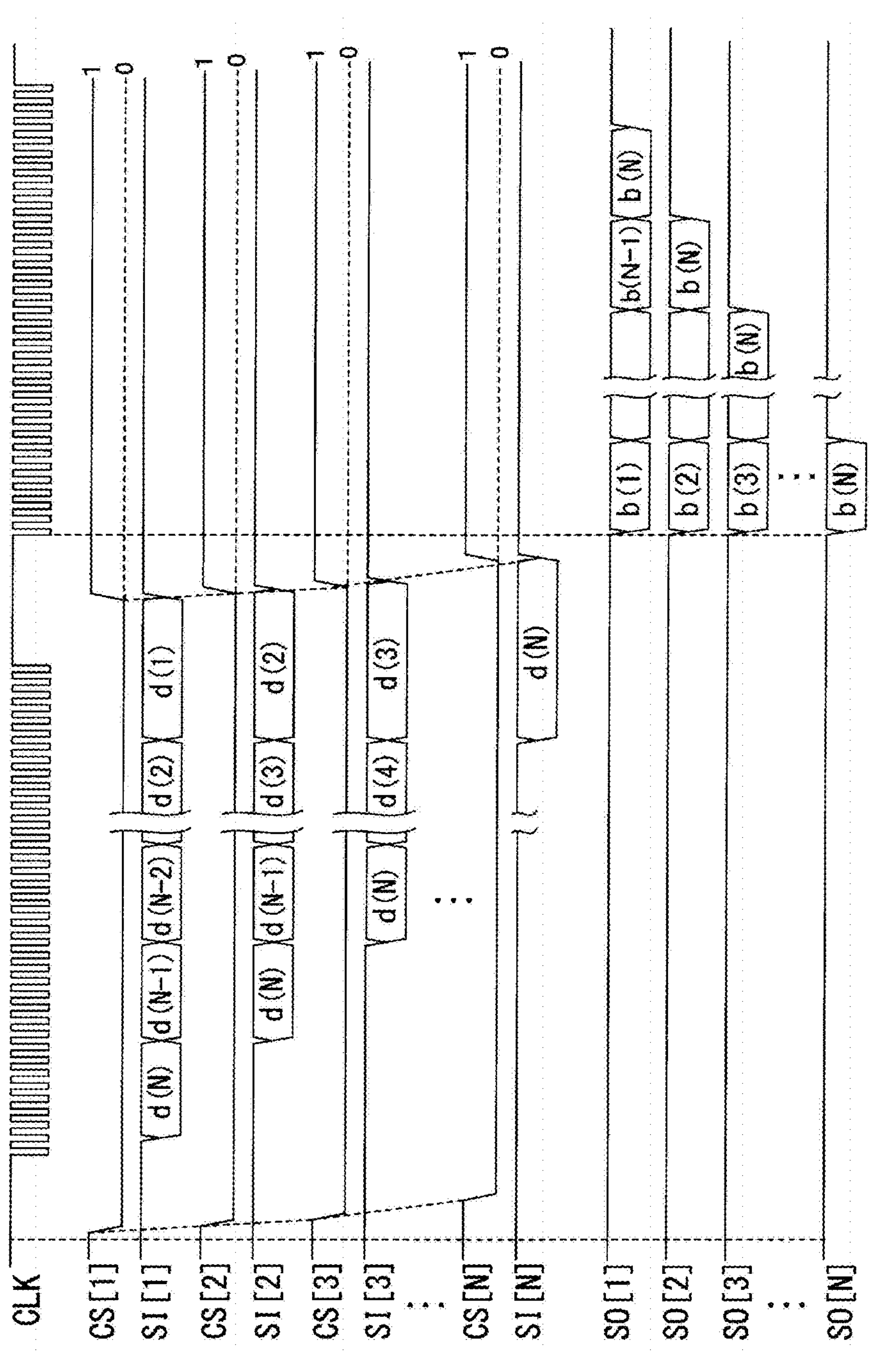
FIG. 9 is a time chart showing a signal format transmitted between a master device 10A and each of slave devices 20A_1 to 20A_N in accordance with the specifications of FIG. 4.

FIG. 9 is a time chart showing the MOSI and MISO signal formats within frames of a predetermined period, which are transmitted between the master device 10A and each of the slave devices 20A_1 to 20A_N in accordance with the specifications of FIG. 4.

[Communication Stop State]

When stopping communication, the master device 10A outputs a clock signal CLK [1] fixed at logic level 1 (or 0) and a chip select signal CS[1] fixed at logic level 1 to the first stage slave device 20A_1.

[Write Operation]

When starting a write operation, the master device 10A first transitions the chip select signal CS[1] from logic level 1 to 0. At this time, the chip select signal CS[1] passes through buffers included in each of the slave devices 20A_1 to 20A_(N−1) and cascade-connected between the slave devices and is propagated to the slave devices 20A_2 to 20A_(N) as chip select signals CS[2] to CS[N] that sequentially transition from logic level 1 to 0 as shown in FIG. 9.

Then, the master device 10A outputs a clock signal CLK [1] and a write data signal SI[1] consisting of a series of write data d(N) to d(1). At this time, the clock signal CLK [1] passes through buffers included in each of the slave devices 20A_1 to 20A_(N−1) and cascade-connected between the slave devices and is propagated to the slave devices 20A_2 to 20A_N as clock signals CLK [2] to CLK [N].

Accordingly, the slave device 20A_k (k is 1, 2, 3, . . . , N) takes in the write data signal SI[k] while shifting it one bit at the timing of the clock signal CLK [k] and outputs it as the write data signal SI[k+1] to the next stage slave device 20A_(k+1).

When the output of the write data signal SI[1] including a series of write data d(N) to d(1) shown in FIG. 9 is completed, the master device 10A stops the clock signal CLK [1] (for example, fixes the clock signal to a state of logic level 1), and subsequently transitions the chip select signal CS[1] from logic level 0 to 1 as shown in FIG. 9. At this time, the slave device 20A_k (k is 1, 2, 3, . . . , N) writes the write data d(k) in the write data signal SI[k] received by them to itself at the rising edge timing of the chip select signal CS[k] from logic level 0 to 1.

[Read Operation]

The slave device 20A_k (k is 1, 2, 3, . . . , N) enters a state in which the acquired data pieces can be read at the rising edge timing of the chip select signal CS[k] described above.

After the master device 10A transitions the chip select signal CS[1] from logic level 0 to 1 as described above, the master device outputs the clock signal CLK [1] to the slave device 20A_1.

Accordingly, the slave device 20A_k (k is 1, 2, 3, . . . , N) reads out the data piece acquired by itself as read data b [k].

Then, the slave device 20A_k starts a read operation of outputting a read data signal SO[k] in which its read data b (k) is added to the beginning of the series of read data pieces included in the read data signal SO[k+1] received from the next stage slave device 20A_(k+1) to the front stage device at the timing of the clock signal CLK [k].

At this time, the master device 10A acquires the data pieces respectively individually acquired by the slave devices 20A_1 to 20A_N, that is, the read data b(1) to b (N)

by taking in the read data signal SO[1] output from the first stage slave device 20A_1 at the timing of the clock signal CLK [1].

Here, the master device 10A stops supplying the clock signal CLK [1] when acquiring the read data b(1) to b (N) included in the read data signal SO[1].

Figure 10:
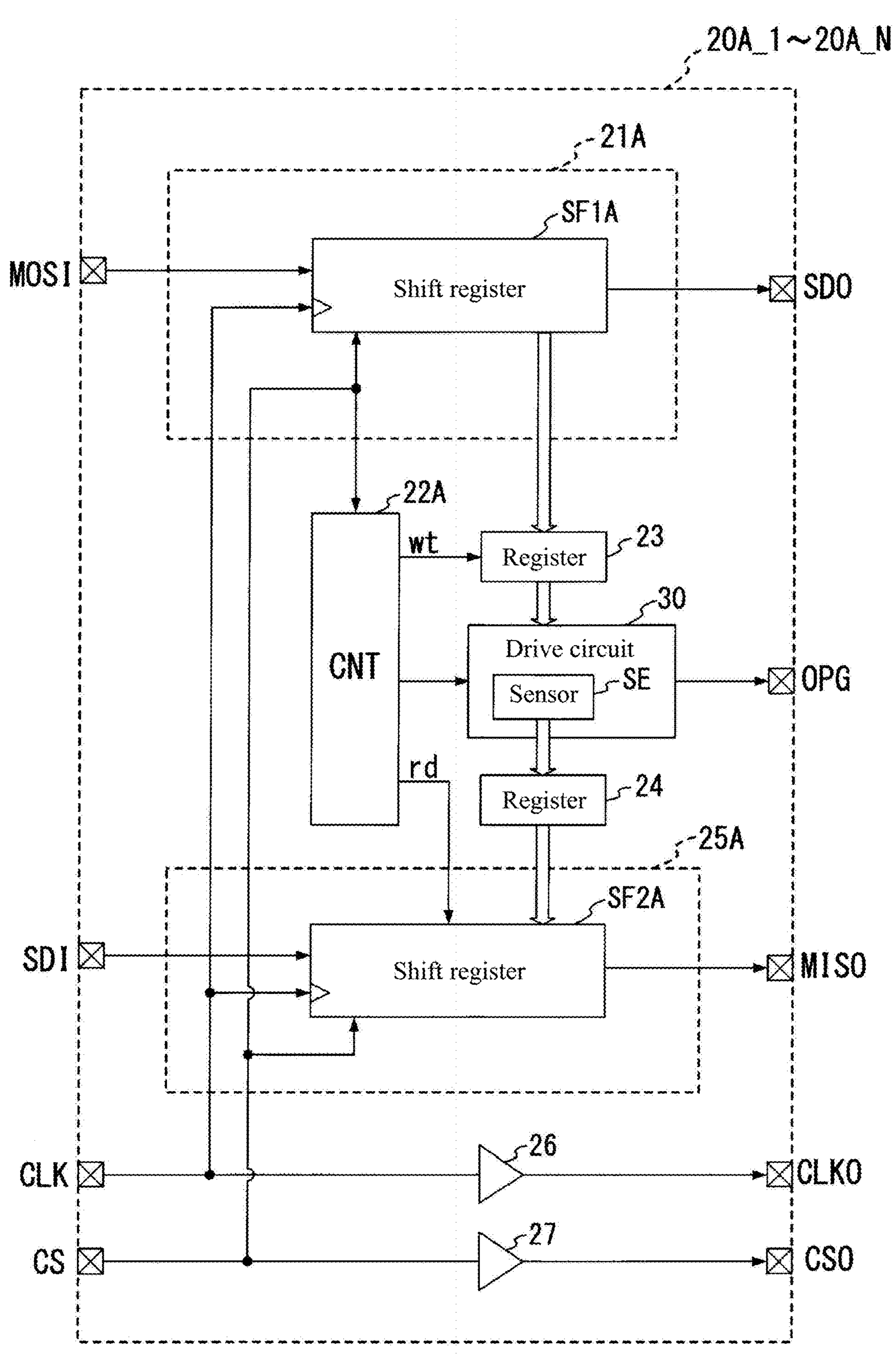
FIG. 10 is a block diagram showing an example of a configuration of the slave devices 20A_1 to 20A_N.

FIG. 10 is a block diagram showing an example of the configuration of the slave devices 20A_1 to 20A_N.

Similarly to the slave devices 20_1 to 20_N, each of the slave devices 20A_1 to 20A_N includes the register 23, 24, the clock buffer 26, and the drive circuit 30. However, each of the slave devices 20A_1 to 20A_N employ a write data transmission/reception circuit 21A, a control circuit 22A, and a read data transmission/reception circuit 25A instead of the write data transmission/reception circuit 21, the control circuit 22, and the read data transmission/reception circuit 25 shown in FIG. 6 and adds a new chip select signal buffer 27.

Further, similarly to the slave devices 20_1 to 20_N, each of the slave devices 20A_1 to 20A_N includes the input terminal MOSI, the output terminal SDO, the input terminal SDI, the output terminal MISO, the input terminal CLK, and the output terminal CLKO. Furthermore, each of the slave devices 20A_1 to 20A_N includes an input terminal CS for inputting the chip select signal CS and an output terminal CSO for outputting the chip select signal CS.

The write data transmission/reception circuit 21A consists of, for example, a shift register SF1A.

The shift register SF1A is set to an enabled state when the chip select signal CS received at the input terminal CS indicates, for example, logic level 0 and is set to a disabled state when the chip select signal CS indicates logic level 1.

When the shift register SF1A is set to the enabled state, a series of write data pieces included in the write data signal SI input to the input terminal MOSI is taken in while being shifted one bit at the timing in synchronization with the clock signal CLK. Then, the shift register SF1A outputs a series of serial bits indicating each piece of write data in the taking order as the write data signal SI from the output terminal SDO. Furthermore, the shift register SF1A converts the taken serial bit series into a parallel signal format for each piece of write data, and sequentially outputs the parallel signal to the register 23.

The control circuit 22A supplies the write instruction signal wt to the register 23 at the rising edge timing when the chip select signal CS transitions from logic level 0 to 1 and also supplies the read instruction signal rd to the read data transmission/reception circuit 25A. Further, the control circuit 22A supplies various control signals that control the drive circuit 30 to the drive circuit 30.

The register 23 holds only the write data piece output at the timing of the write instruction signal wt among the write data pieces output from the shift register SF1A, and supplies the write data piece to the drive circuit 30. Accordingly, the drive circuit 30 generates a drive current having a current value according to the write data piece supplied from the register 23 and outputs the drive current to a load externally attached to the output terminal OPG, such as an LED backlight of a liquid crystal display or a lighting LED, at the output timing specified by the write data piece.

The register 24 holds a sensor data piece acquired by the sensor SE included in the drive circuit 30 as a read data piece.

The read data transmission/reception circuit 25A consists of, for example, a shift register SF2A.

The shift register SF2A is set to the enabled state when the above-described chip select signal CS indicates logic level 1 while being set to the disabled state when the chip select signal CS indicates logic level 0.

When the shift register SF2A is set to the enabled state, the shift register SF2A takes in the read data piece held in the register 24 in response to the read instruction signal rd supplied from the control circuit 22A.

Then, the shift register SF2A outputs the taken read data piece while shifting the read data piece one bit at the timing in synchronization with the clock signal CLK. In the meantime, the shift register takes in a series of read data pieces included in the read data signal SO input to the input terminal SDI at the timing in synchronization with the clock signal CLK while shifting them one bit and outputs the read data pieces in the taking order. Accordingly, following its read data piece, the shift register SF2A outputs, as the read data signal SO, a serial signal indicating a series of read data pieces included in the read data signal SO input to the input terminal SDI from the output terminal MISO.

The buffer 26 outputs a clock signal CLK obtained by amplifying the clock signal CLK received at the input terminal CLK from the output terminal CLKO.

The buffer 27 outputs a chip select signal CS obtained by amplifying the chip select signal CS received at the input terminal CS from the output terminal CSO.

Furthermore, each of the write data transmission/reception circuit 21A and the read data transmission/reception circuit 25A may be configured with a First-In First Out (FIFO) memory or the like.

Incidentally, the master device 10 and the slave devices 20_1 to 20_N shown in FIG. 2 or the master device 10A and the slave devices 20A_1 to 20A_N shown in FIG. 8 are formed on the respectively independent semiconductor chips and a total of (N+1) semiconductor chips are mounted in parallel on one substrate.

Figure 11:
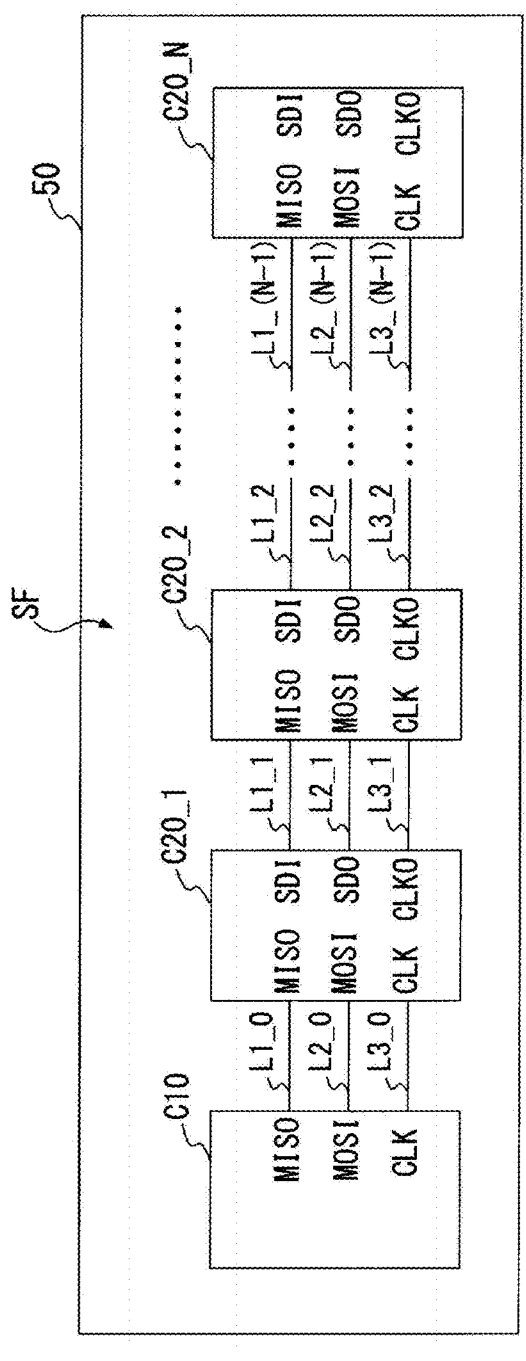
FIG. 11 is a top view of a substrate 50 on which a semiconductor chip C10 including the master device 10A and semiconductor chips C20_1 to 20_N each individually including the slave devices 20A_1 to 20A_N are mounted when viewed from the top side.

FIG. 11 is a top view of a substrate 50 on which the semiconductor chip C10 including the master device 10 shown in FIG. 2 and semiconductor chips C20_1 to 20_N respectively individually including the slave devices 20_1 to 20_N are mounted when viewed from the top side.

As shown in FIG. 11, the input terminals MISO, MOSI, and CLK are formed on one side of the semiconductor chip C10 including the master device 10 on the front surface SF of the substrate 50. Furthermore, the semiconductor chips C10 and C20_1 are connected by wires L1_0, L2_0, and L3_0, and the semiconductor chips C20_1 and C20_2 are connected by wires L1_1, L2_1, and L3_1. That is, in the semiconductor chips C20_1 to C20_N, the adjacent semiconductor chips C20_*k* (k is 1, 2, 3, . . . , N−1) and C20_(k+1) are connected by adjacent wires L1_*k*, L2_*k*, and L3_*k*.

In this way, among the semiconductor chips C10, C20_1 to C20_N arranged in a row on the front surface SF of the substrate 50, the adjacent ones are connected to each other by three wires.

Therefore, since the wires connecting the semiconductor chips C10 and C20_1 to C20_N do not cross each other, it is possible to provide all the wires only on a single conductive layer formed on the front surface SF of the substrate 50. Therefore, since there is no need to use a multilayer substrate as the substrate 50, it possible to reduce product costs. Furthermore, since the connection between the semiconductor chips C10 and each of the semiconductor chips C20_1 to C20_N can be made using only one conductive layer even when the multilayer substrate is used as the substrate 50, the manufacturing effort can be saved.

Figure 12:
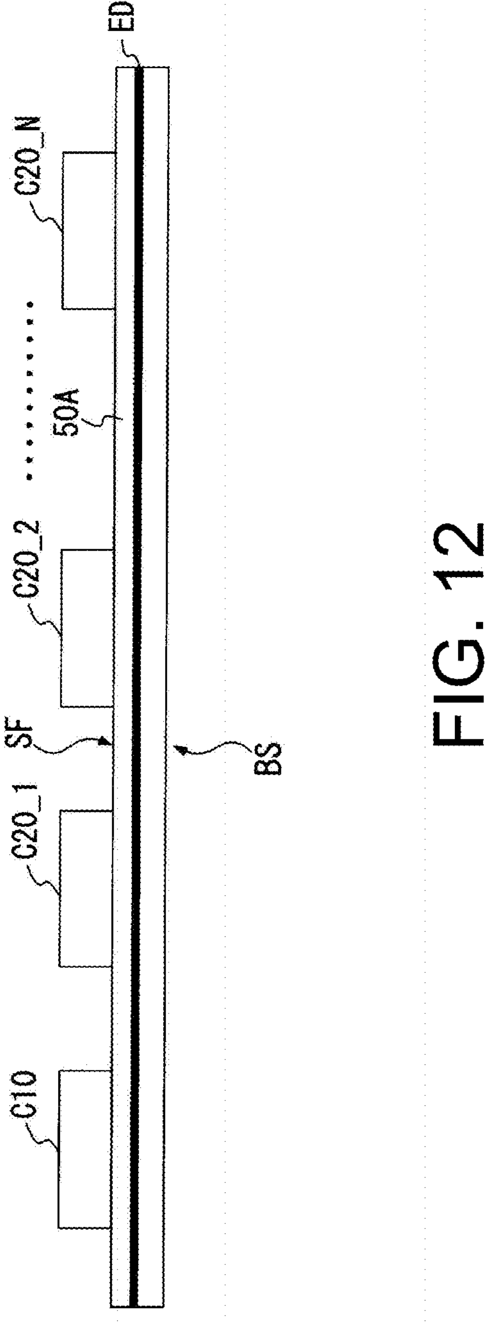
FIG. 12 is a side view of a substrate 50A on which the semiconductor chips C10 and C20_1 to 20_N are mounted and which has an electrode layer ED therein when viewed from the side.

FIG. 12 is a side view of a substrate 50A having three conductive layers in which the semiconductor chip C10 and C20_1 to C20_N are mounted on the front surface SF of the substrate and the electrode layer ED is provided inside the substrate. According to such a configuration, wire connecting each of the semiconductor chips C10 and C20_1 to C20_N may be provided on any one of the front surface SF, the back surface BS, or the electrode layer ED in the substrate 50A as shown in FIG. 11.

As described above in detail, the data communication system (100, 200) according to the disclosure includes the master device (10, 10A), the first slave device (20_1, 20A_1) connected to the master device, and the second to N-th (N is an integer of 2 or more) slave devices (20_2 to 20_N, 20A_2 to 20A_N) cascade-connected to the first slave device. At this time, three wires (L1 to L3) connect the master device and the first slave device and connect the adjacent slave devices in the first to N-th slave devices in order to individually transmit each of the clock signal (CLK [1] to [N]), the write data signal (SI[1] to [N]), and the read data signal (SO[1] to [N]).

The master device (10, 10A) transmits the generated clock signal (CLK) to the first slave device (20_1, 20A_1) and transmits the write data signal (SI) including the first to N-th write data pieces respectively corresponding to the first to N-th slave devices to the first slave device at the timing of the clock signal. Each of the first to N-th slave devices (20_1 to 20_N, 20A_1 to 20A_N) includes a buffer (26) that receives a clock signal transmitted from a front stage and transmits the internally transmitted clock signal to the next stage slave device and an information acquisition circuit (SE) that acquires an information data piece (for example, sensor data) and reads the information data piece as a read data piece. Here, the first to N-th slave devices take in a series of first to N-th write data pieces [d(1) to d(N)] included in the write data signal while shifting them at the timing of the clock signal supplied from each of the front stage devices and transmit the read data signal including a series of read data pieces [b(1) to b (N)] read from each information acquisition circuit from the first slave device to the master device while shifting them at the timing of the clock signal described above.

Therefore, according to such a data communication system, since the load connected to the wire for transmitting the clock signal is only a single slave device, it is possible to suppress the waveform dullness of the clock signal to less than a predetermined value regardless of the number of stages of slave devices connected in cascade.

Incidentally, according to the data communication system, the clock signal received by the N-th slave device at the last stage is delayed with respect to the clock signal output from the master device, that is, the clock signal received by the first slave device.

However, the communication between the master device and the first to N-th slave devices using the data communication system is established by the communication between the master device and the first slave device synchronized with the clock signal output by the master device and the communication synchronized with the clock signal output by one slave device between adjacent slave devices.

Therefore, even if there is a delay corresponding to the number of stages of cascades of slave devices in the clock signal received by the N-th slave device at the last stage with respect to the clock signal output from the master device, communication can be executed in synchronization with the clock signal.

Therefore, according to the disclosure, high-speed communication can be executed regardless of the number of stages of slave devices connected to the master device.

What is claimed is:

1. A data communication system comprising:

a master device;

a first slave device connected to the master device; and a second to N-th slave devices cascade-connected to the first slave device, N being an integer of 2 or more, wherein the master device and the adjacent devices of the first to N-th slave devices are connected by at least three wires including a wire for transmitting a clock signal, a wire for transmitting a write data signal, and a wire for transmitting a read data signal, wherein the master device executes a write operation of transmitting as the write data signal a signal including a series of first to N-th write data pieces respectively taken into the first to N-th slave devices to the first slave device within a predetermined period, wherein the clock signal is sequentially transmitted from the master device to the first to N-th slave devices and is responsible for a timing of transmitting or receiving the write data signal and the read data signal in each of the first to N-th slave devices, wherein the first to N-th slave devices take in a write data piece corresponding to itself from the write data signal received from a front stage device based on the clock signal received from the front stage device, transmit as the write data signal a signal including a series of write data piece obtained by excluding the taken write data piece to a rear stage device, and transmit as the read data signal a signal including a series of read data pieces obtained by adding a read data piece acquired within itself to the read data signal received from the rear stage device to the front stage device, and wherein the master device further executes a read operation of receiving the read data signal including a series of first to N-th read data pieces respectively acquired from the first to N-th slave devices from the first slave device within the predetermined period.

2. The data communication system according to claim 1, wherein the write data signal transmitted to the first slave device by the master device is a signal obtained by arranging the first to N-th write data pieces respectively taken into the first to N-th slave devices in the order of the N-th to first write data pieces, and wherein the read data signal received from the first slave device by the master device is a signal obtained by arranging the first to N-th read data pieces respectively acquired by the first to N-th slave devices in the order of the first to N-th read data pieces.

3. The data communication system according to claim 1, wherein the master device controls the first to N-th slave devices so that one operation of the write operation and the read operation is completed and then the other operation is executed within the predetermined period.

4. The data communication system according to claim 3, wherein the master device adds an identification code to the beginning of the one of the write data signal and the read data signal that is transmitted first within the predetermined period.

5. The data communication system according to claim 4, wherein the identification code is data indicating the number of cascades of the first to N-th slave devices, and wherein each of the first to N-th slave devices transmits an identification code indicating the new number of stages of cascades obtained by subtracting data for one stage from data indicating the number of stages of cascades indicated by the identification code received from the front stage device to a rear stage device.

6. The data communication system according to claim 1, wherein the master device stops transmitting the clock signal during a communication stop period in which the write data signal is not transmitted and the read data signal is not received.

7. The data communication system according to claim 1, wherein each of the first to N-th slave devices connected in cascade includes a first input terminal that receives the clock signal transmitted from the front stage device, a first output terminal that internally transmits the clock signal received at the first input terminal and transmits the clock signal to the rear stage device, a second input terminal that receives the write data signal transmitted from the front stage device, a second output terminal that transmits the write data signal received at the second input terminal to the rear stage device at a timing of the clock signal received at the first input terminal, a third input terminal that receives the read data signal transmitted from the rear stage device, and a third output terminal that transmits the read data signal received at the third input terminal to the front stage device at the timing of the clock signal received at the first input terminal.

8. The data communication system according to claim 7, wherein the N-th slave device with the largest number of stages in the cascade connection among the first to N-th slave devices has the first output terminal and the second output terminal in an open state and the third input terminal is supplied with a predetermined fixed level.

9. The data communication system according to claim 1, wherein adjacent devices of the master device and the first to N-th slave devices are connected by wires that transmit a chip select signal for instructing the write operation or the read operation.

10. The data communication system according to claim 1, wherein communication between the master device and the first to N-th slave devices is executed in the form of serial signals based on a serial peripheral interface standard.

11. The data communication system according to claim 1, wherein the first to N-th slave devices have the same configuration and are respectively formed on independent first to N-th semiconductor chips.

12. The data communication system according to claim 1, further comprising:

a substrate that has a front surface on which the master device and the first to N-th slave devices are arranged side by side and that has a first conductive layer provided with the three wires.

13. A slave device comprising:

a first input terminal for receiving a write data signal;

a second input terminal for receiving a read data signal;

a third input terminal for receiving a clock signal;

a first to third output terminals;

a write data transmission/reception circuit that outputs the write data signal received at the first input terminal from the first output terminal at a timing of the clock signal received at the third input terminal; and a read data transmission/reception circuit that outputs the read data signal received at the second input terminal from the second output terminal at the timing of the clock signal received at the third input terminal, wherein the clock signal received at the third input terminal is internally transmitted and output from the third output terminal, wherein the write data transmission/reception circuit executes a write operation of taking in a write data piece corresponding to itself from a series of write data pieces consisting of at least one write data piece included in the write data signal received at the first input terminal and outputting a write data signal including a series of write data pieces obtained by excluding the taken write data piece from the first output terminal at the timing of the clock signal received at the third input terminal within a predetermined period, and wherein the read data transmission/reception circuit executes a read operation of outputting a read data signal including an information data piece acquired within itself as a read data piece in the read data signal received at the second input terminal from the second output terminal at the timing of the clock signal received at the third input terminal within the predetermined period.

14. The slave device according to claim 13, further comprising:

a control circuit that controls the write data transmission/reception circuit and the read data transmission/reception circuit so that one operation of the write operation and the read operation is completed and then the other operation is switched within the predetermined period.

15. The slave device according to claim 14, wherein an identification code is added to the beginning of the one of the write data signal and the read data signal that is transmitted first within the predetermined period.

16. The slave device according to claim 13, further comprising:

an information acquisition circuit that acquires the information data piece;

a first register that holds the write data piece corresponding to itself, a second register that holds the information data piece as the read data piece;

a drive circuit that outputs a drive signal for driving a load based on the write data piece held by the first register; and a control circuit that controls the first register and the second register, the drive circuit, the write data transmission/reception circuit, and the read data transmission/reception circuit.

17. The slave device according to claim 13, wherein a chip select signal for instructing the write operation or the read operation is received and the write data transmission/reception circuit executes the write operation in response to the chip select signal indicating the write operation, and the read data transmission/reception circuit executes the read operation in response to the chip select signal indicating the read operation.

18. The slave device according to claim 13, further comprising:

a buffer that amplifies the clock signal received at the third input terminal and outputs the clock signal from the third output terminal.

* * * * *